United States Patent
Bae et al.

(10) Patent No.: US 7,315,589 B2
(45) Date of Patent: Jan. 1, 2008

(54) APPARATUS AND METHOD FOR SELECTING OPTIMAL BEAM FOR DIGITAL TV RECEIVER

(75) Inventors: Jae-Hwui Bae, Daejon (KR); Jae-Hyun Seo, Daejon (KR); Seung-Won Kim, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 827 days.

(21) Appl. No.: 10/749,322

(22) Filed: Dec. 31, 2003

(65) Prior Publication Data

US 2004/0252244 A1    Dec. 16, 2004

(30) Foreign Application Priority Data

Jun. 14, 2003  (KR) ...................... 10-2003-0038482

(51) Int. Cl.
*H03D 1/00* (2006.01)
*H04L 27/06* (2006.01)

(52) U.S. Cl. ...................... 375/343; 375/349; 375/347; 375/346; 375/148; 375/150

(58) Field of Classification Search ................ 375/150, 375/148, 142, 144, 343, 346–349; 455/273, 455/133, 137, 277.1
See application file for complete search history.

(56) References Cited

U.S. PATENT DOCUMENTS 6,714,584 B1* 3/2004 Ishii et al. .................. 375/148

6,946,993 B2* 9/2005 Seo et al. ................... 342/374
7,103,120 B2* 9/2006 Shibata ....................... 375/347
7,209,512 B2* 4/2007 Jitsukawa et al. .......... 375/148

FOREIGN PATENT DOCUMENTS

| KR | 2001-0093207 | 10/2001 |
|----|--------------|---------|
| KR | 2002-0003876 | 1/2002  |
| KR | 2002-0033788 | 5/2002  |
| KR | 2002-0049358 | 6/2002  |

* cited by examiner

*Primary Examiner*—Phuong Phu
(74) *Attorney, Agent, or Firm*—Blakely, Sokoloff, Taylor & Zafman

(57) ABSTRACT

There is provided to an apparatus and method for selecting a beam having an optimal channel characteristic among multiple beams, which are formed at a digital TV receiver employing a switched beamforming part. The beam selecting apparatus of the digital TV receiver having a switched beamformer and a channel equalize includes: a correlating unit for calculating cross-correlation values with respect to previous known Field Sync signals and Field Sync signals of beams having energy larger than a predefined value among beams outputted from the switched beamformer; a channel profile extracting unit for extracting multi-path channel profiles of the beams by using the cross-correlation values; an effective signal path searching unit for obtaining the number of effective signal paths having values larger than a predefined threshold based on the channel profiles; and a beam selecting unit for selecting beams of a channel profile having the smallest number of the effective signal paths among the beams outputted from the switched beamforming means as an input beam of the channel equalizer.

6 Claims, 12 Drawing Sheets

APPARATUS AND METHOD FOR SELECTING OPTIMAL BEAM FOR DIGITAL TV RECEIVER

FIELD OF THE INVENTION

The present invention relates to an apparatus and method for selecting an optimal beam for a digital TV receiver; and, more particularly, to an apparatus and method for selecting a beam having an optimal channel characteristic among multiple beams, which are formed at a digital TV receiver employing a switched beamforming part.

DESCRIPTION OF THE PRIOR ART

Generally, in a digital television (DTV) system adopting a vestigial side band (VSB) mode, a transmission signal to a receiver is distorted due to an effect of channel. Such an effect of channel includes multi-paths, Doppler frequency, dynamic channel characteristic of mobile reception. A spectrum of an original signal is distorted due to the multipath interferences, and thus the receiver receives distorted signals different from the transmitted signal. The degree of distortion depends on a characteristic of a transmission channel. In case a line of sight exists between a transmitter and a receiver and thus a main path signal occurs apparently, a relatively slight signal distortion occurs. Like an indoor reception, however, in case there exist many reception paths each of which has similar amplitude, the signal is greatly distorted due to interference between the paths.

A receiver of a conventional DTV system employs a channel equalizer to compensate these channel distortions through a signal processing in time domain. Specifically, like a Ricean channel, in case a main path exists apparently since a difference of amplitudes between the main path and the multi-path is great, the channel equalizer has an equalizing performance enough to restore an original signal.

Like a Rayleigh channel, however, in case a difference of amplitudes between the main path and the multi-path is small, the channel equalizer does not have a sufficient equalizing performance, so that it is difficult to restore the original signal. Actually, the original signal is greatly distorted due to the interferences among multiple receiving signal paths, which may appear commonly in a downtown area where there are many communication obstacles like skyscrapers and in an indoor reception channel where a reception electric field strength is low and various multi-paths exist. Since the compensation using the channel equalizer is not achieved sufficiently in these channels, an output signal of the channel equalizer has too many errors to restore the original signal. So, it is difficult to restore the original signal if the Trellis decoder and the Reed-Solomon decoder cannot reduce the errors below the Threshold of Visibility (TOV) in baseband channel decoding process. Consequently, a digital TV receiver cannot restore the original signal.

In order to solve the problem that the reception performance is degraded due to the interferences among the dynamic multiple reception paths, there is a related art which can reduce the interference among the multiple paths through a spatio-temporal signal processing method, in which a space-domain signal processing is combined with a time-domain signal processing. The channel equalizing performance can be improved by applying both the space-domain signal processing method and the time-domain signal processing method.

A typical space-domain signal processing method is a beamforming method adopting an array antenna. By the beamforming, reception paths of desired azimuths are received through a pre-defined beam width in the space domain and reception paths of undesired azimuths are attenuated greatly, so that they may not make interferences and may have little influences on the reception performance.

According to one example of the digital TVs employing the conventional beamforming method, an Inter-Symbol interference (ISI) is reduced by applying an adaptive beamforming method to Orthogonal Frequency Division Multiplex (OFDM) transmission system which is adopted as transmission standard for DVB. According to another example, an Inter-Symbol Interference is reduced by applying the adaptive beamforming method to VSB system. Meanwhile, if an angle-spread exists, the adaptive beamforming method forms a beam in a direction of each multi-path and receives all signals of two reception paths. Therefore, if there are multi-paths, whose amplitude difference is close to 0 dB, in the reception signals, then it is difficult to achieve the desired multipath elimination performance and to improve the reception performance. For this reason, a switched beamforming method is preferred for VSB receiver.

Even in the case of the related art employing the switched beamforming method, however, a performance of the receiver will be degraded if a beam having the optimal channel characteristic is not selected among the multiple beams formed. Consequently, it is necessary to select a beam having the optimal channel characteristic not only by the output energy of a beam but also by extracting channel profiles of the received signals.

SUMMARY OF THE INVENTION

It is, therefore, an object of the present invention to provide an apparatus and method for selecting a beam having an optimal channel characteristic among the multiple beams, which are formed in a digital TV receiver employing a switched beamforming unit.

In accordance with one aspect of the present invention, there is provided a beam selecting apparatus of a digital TV receiver, which has a switched beamforming unit and a channel equalizing unit. The beam selecting apparatus includes: a correlating unit for calculating cross-correlation values between the known PN511 sequence in Field Sync and the Field Sync signal of each beam, the beams having energy larger than a predefined value among beams outputted from the switched beamforming unit; a channel profile extracting unit for extracting multi-path channel profiles of the beams by using the cross-correlation of PN511 sequences in Field Sync; an effective signal path searching means to count the number of effective signal paths having values larger than a predefined threshold based on the channel profiles; and a beam selecting means to select a beam, whose channel profile has the smallest number of effective signal paths among the beams formed in the switched beamforming unit, as an input beam of the channel equalizing means.

In accordance with another aspect of the present invention, there is provided a beam selecting method of a digital TV receiver, which has a switched beamforming unit and a channel equalizing unit. The beam selecting method includes the steps of: a) calculating cross-correlation values between the known PN511 sequence in Field Sync signal and the Field Sync signal of each beam, the beams having energy larger than a predefined value among the beams formed in the switched beamforming unit; b) extracting multi-path channel profiles of the beams by correlating the PN511 sequence in Filed sync; c) obtaining the number of effective signal paths having values larger than a predefined threshold based on the channel profiles; and d) selecting a beam, whose channel profile has the smallest number of the effective signal paths among the beams outputted from the switched beamforming unit, as an input beam of the channel equalizing unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
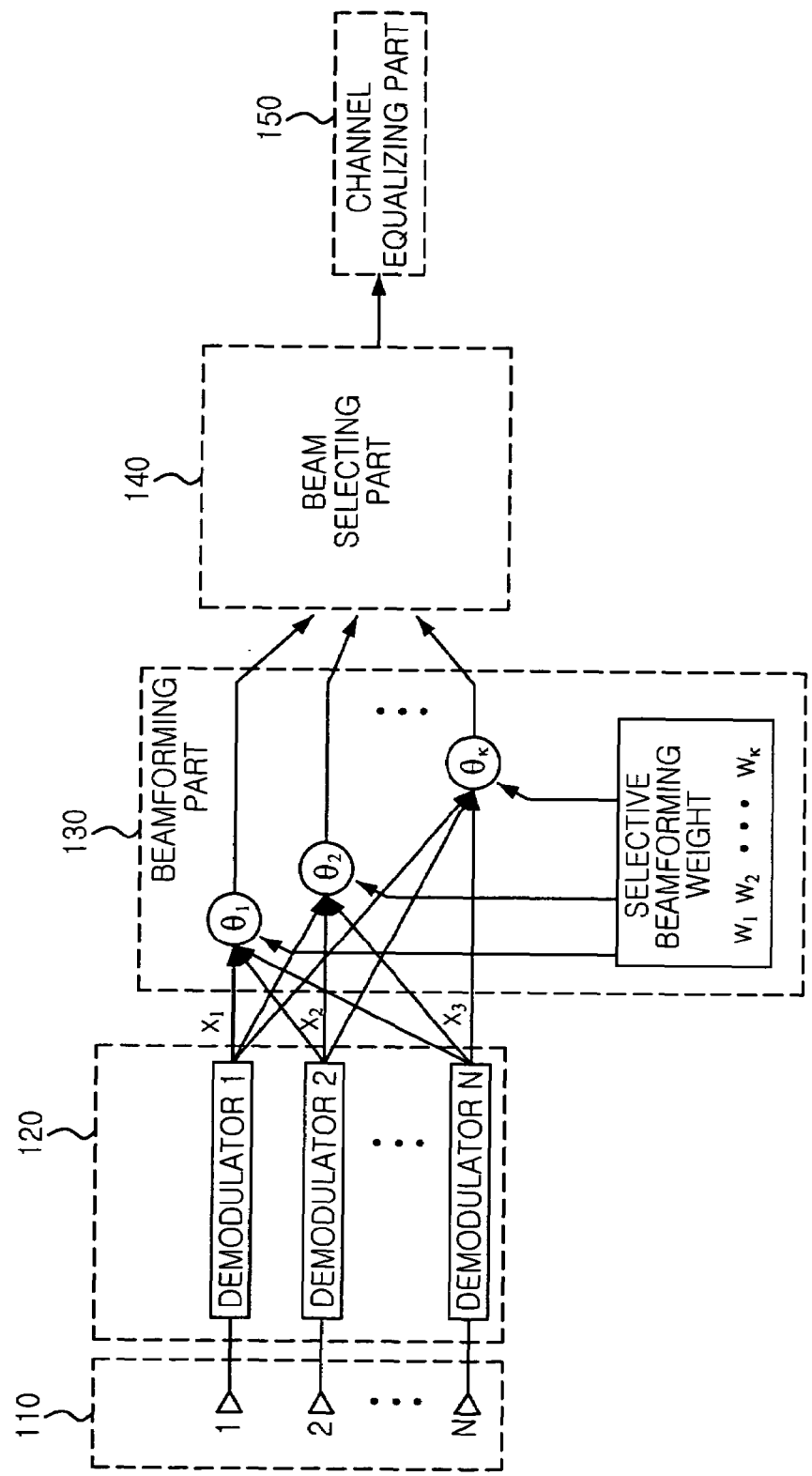
FIG. 1 illustrates a detailed configuration of a digital TV receiver in accordance with the present invention.

FIG. 1 illustrates a configuration of a digital TV receiver in accordance with the present invention. As shown in FIG. 1, an array antenna part 110 is provided with a plurality of antenna elements and a demodulating part 120 is provided with a plurality of demodulators. The array antenna part 110 receives a transmitted DTV signal and the demodulating part 120 demodulates outputs of the antenna elements into baseband signals. A beamforming part 130 uses the baseband signals to form multiple beams directing predefined azimuths, and a beam selecting part 140 selects an optimal beam among the beams and transmits the selected beam to a channel equalizing part 150.

Figure 2:
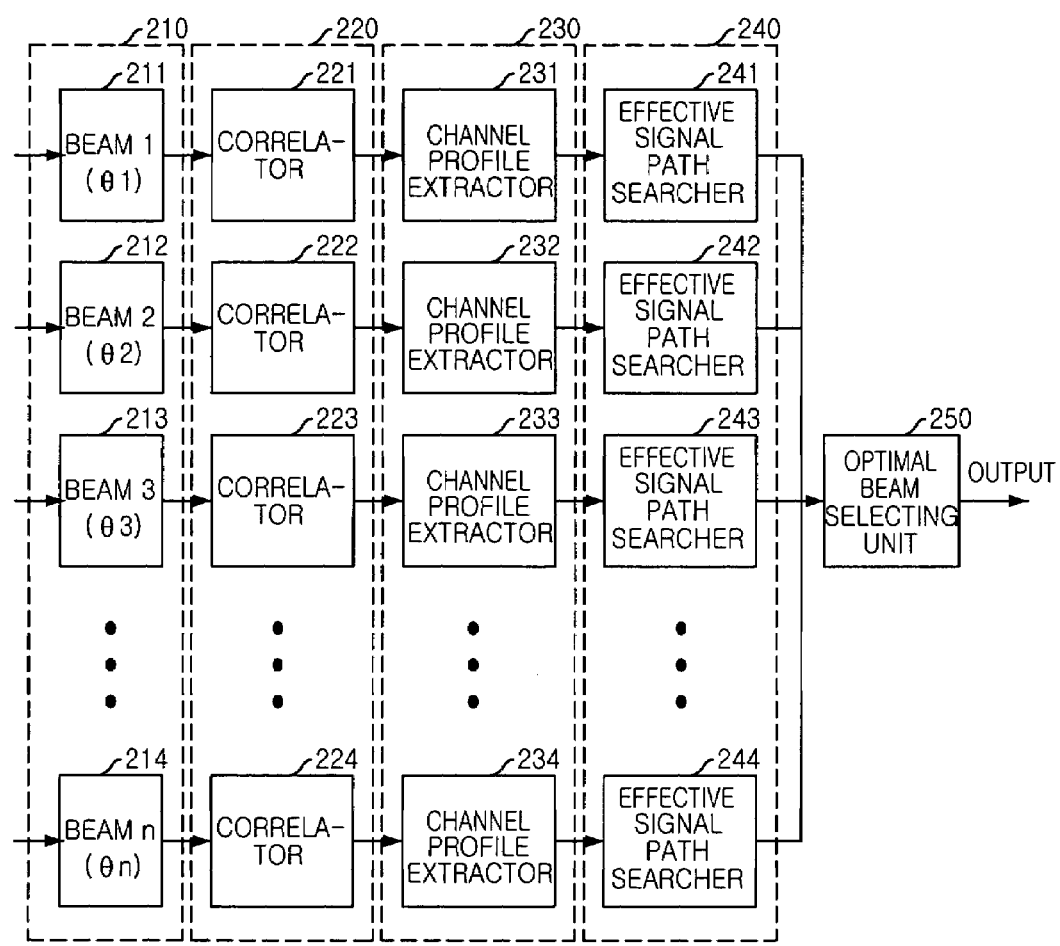
FIG. 2 is a detailed block diagram of a beam selecting part shown in FIG. 1.

FIG. 2 is a detailed block diagram of the beam selecting part shown in FIG. 1. Referring to FIG. 2, the beam selecting part 140 includes a beam classifying unit 210, a correlating unit 220, a channel profile extracting unit 230, an effective signal path searching unit 240 and an optimal beam selecting unit 250.

The beam classifying unit 210 classifies beams having energy higher than a predetermined value among the beams outputted from the beamforming part 130, and the classified beams are inputted into the correlating unit 220 provided with a plurality of correlators 221 to 224. The beams classified by the beam classifying unit 210 can be all of the beams formed in the beamforming part 130 according to a designer's selection.

The correlating unit 220 performs cross-correlation between the PN511 sequence and the Field Sync of each classified beam output.

The channel profile extracting unit 230 obtains a multi-path channel profile using the cross-correlation values, and the effective signal path searching unit 240 obtains the number of effective signal paths (multi-paths having a value larger than a predefined threshold) using the multi-path channel profile. Here, the threshold is determined to an extent that the channel equalizing part 150 overcomes the multi-path signal when the amplitudes of the main path signal and the multi-path signal are considered in the channel profile. Accordingly, the threshold will be determined depending on the performance of the channel equalizing part 150.

At the optimal beam selecting unit 250, the beam of the channel profile having the largest amplitude of the effective signal path is selected among the beams of the channel profiles having the smallest number of the effective signal paths. Among the beams outputted from the beamforming part 130, the beam selected by the optimal beam selecting unit 250 is inputted to the channel equalizing part 150.

Figure 3:
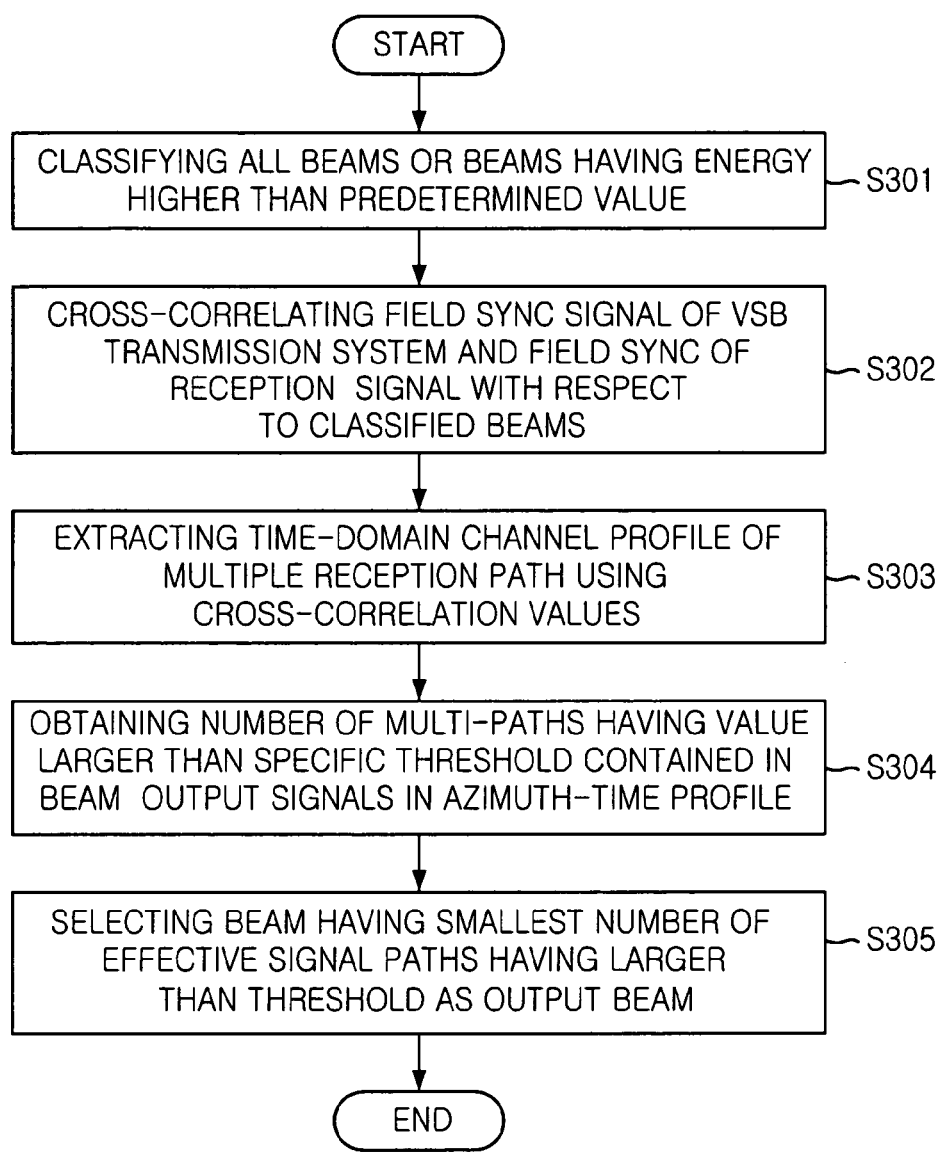
FIG. 3 is a flowchart of an optimal beam selecting process in accordance with the present invention.

FIG. 3 is a flowchart of the optimal beam selecting process in accordance with the present invention. Referring to FIG. 3, the beam classifying unit 210 classifies beams having energy higher than a predetermined value among the beams outputted from the beamforming part 130 at step S301. The beams classified by the beam classifying unit 210 can be all of the beams formed in the beamforming part 130 according to a designer's selection.

Then, the correlating unit 220 cross-correlates a previously known Field Sync PN511 signal of a VSB transmission system and a Field Sync of the reception signal contained in the classified beam with respect to the classified beams at step S302. The channel profile extracting unit 230 extracts a time-domain channel profile of the multiple reception paths using the cross-correlation values at step S303.

Then, the effective signal path searching unit 240 calculates the number of effective signal paths having a value larger than a specific threshold, which are contained in each beam output in the channel profile extracted at the step S303 and at step S304. At the optimal beam selecting unit 250, the beam of the channel profile having the largest amplitude of the effective signal path is selected among the beams of the channel profiles having the smallest number of the effective signal paths. Among the beams outputted from the beamforming part 130, the beam selected by the optimal beam selecting unit 250 is inputted to the channel equalizing part 150.

A detailed description will be made on a method for selecting an optimal beam having the most excellent channel characteristic in view of the channel equalizing part of the VSB receiver, in case three beams are formed using a linear array antenna having five antenna elements applied to a VSB transmission method.

Figure 4:
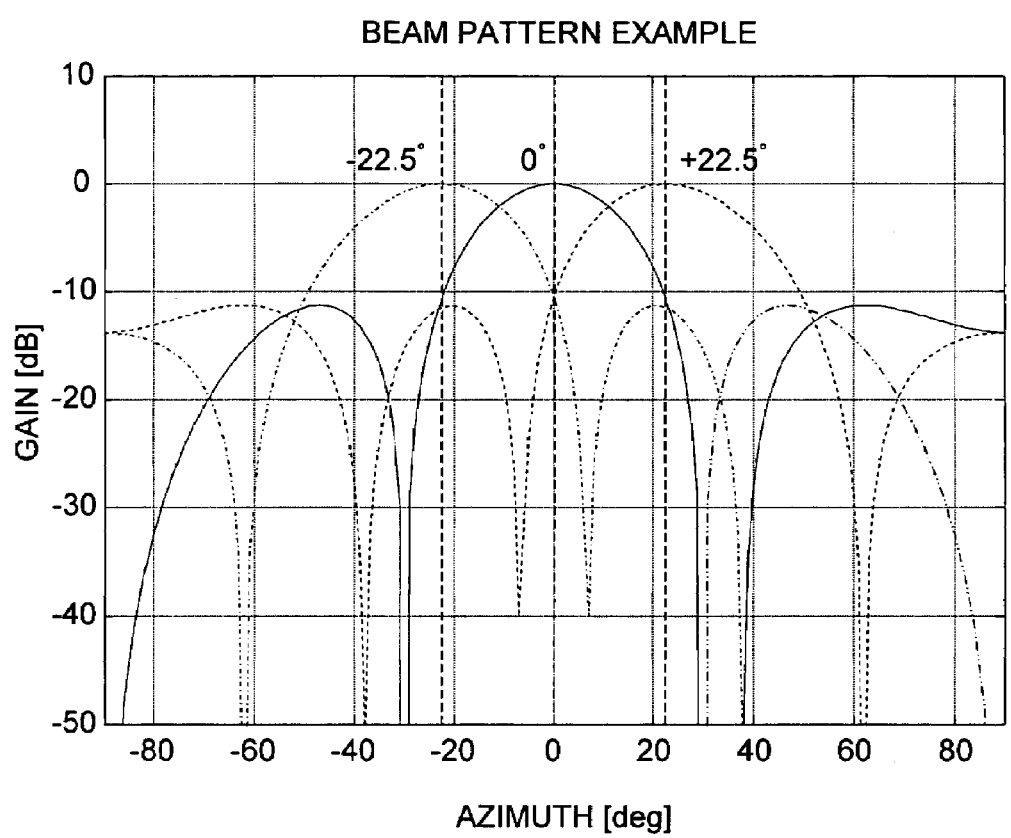
FIG. 4 is an example of a beam pattern having steering angles of −22.5°, 0° and +22.5° in accordance with an embodiment of the present invention.

FIG. 4 is a graph of beam patterns having steering angles of −22.5°, 0° and +22.5° in accordance with an embodiment of the present invention. The steering angles of the tree beams are −22.5°, 0° and +22.5° and FIG. 4 illustrates the three beam patterns. Generally, the array antenna of the DTV having the switched beamforming part is mounted on a roof of a vehicle, and there is a low probability that a signal is incident to the antenna in a horizontal direction. Therefore, it has only to consider a signal that is incident over the array antenna. Accordingly, since signals received in a horizontal direction and from a bottom of the antenna have very small values, the DTV array antenna has a reception range between −90° and +90° if considering only a vertical direction.

Figure 5:
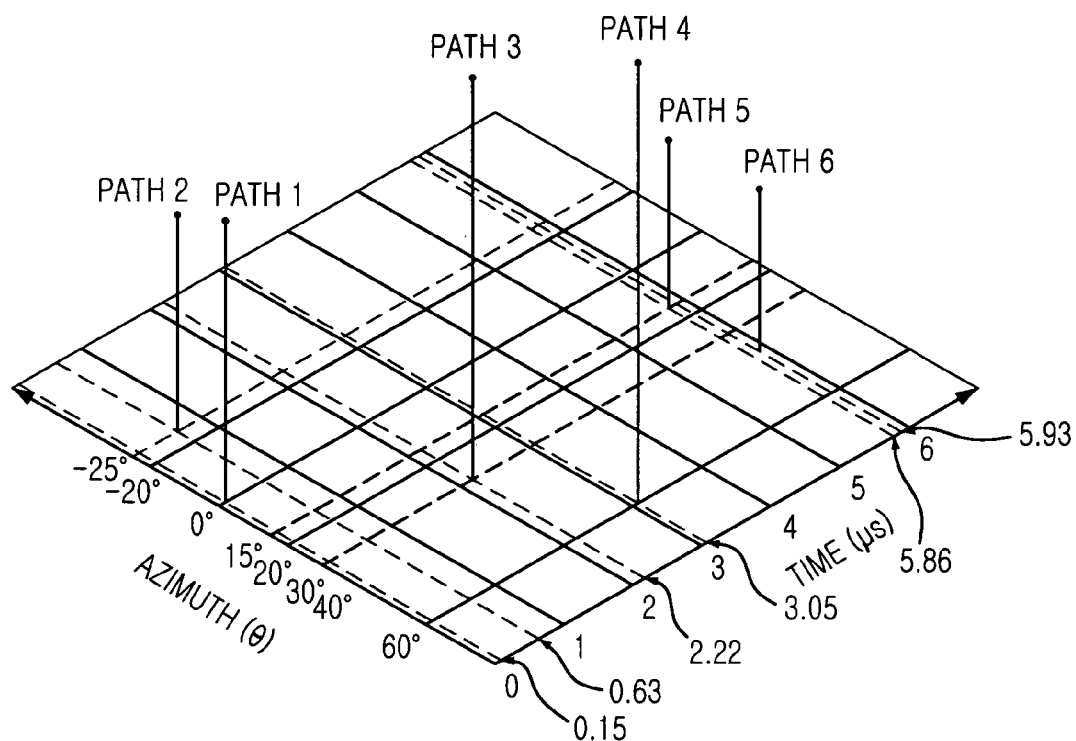
FIG. 5 illustrates an azimuth-time profile with respect to Brazil D channel.

Meanwhile, the multi-path profile of channel applied to the embodiment of the present invention applies a Type D of Brazil test (Brazil D channel) having the worst characteristic among channels applied in the DTV performance tests performed until now, and each path receiving angle is assigned arbitrarily. A following Table 1 shows a multi-path profile of the channel model and the reception angle information. FIG. 5 illustrates an azimuth-time profile of the Brazil D channel.

While the signal of the path 1 incident at 0° is received without any attenuation, the path 5 incident at 15° has a relative amplitude of 1.02. However, it is attenuated as much as about −4 dB by the beamforming, so that the beam output signal has a characteristic similar to the Ricean channel in which an amplitude difference between the main path and the multi-path is 4 dB or more. An energy of the beam output signal having the steering angle of 0° is about 24.2, which is relatively large energy compared with that of the beam having the steering angle of −22.5°.

Figure 6A:
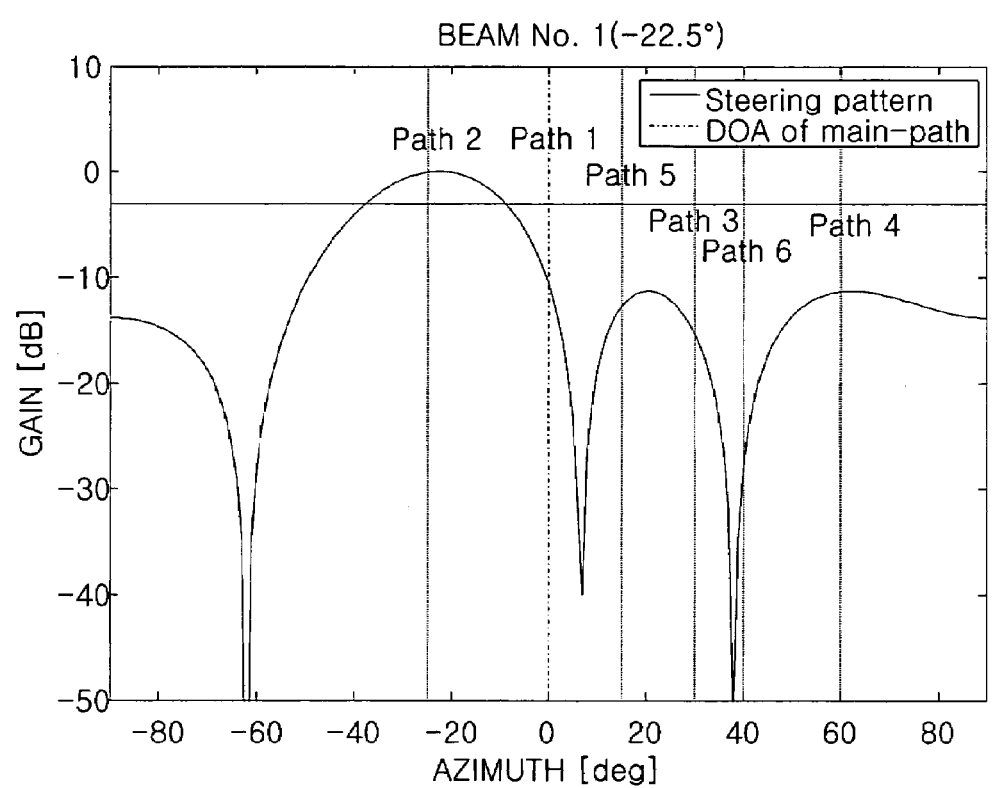
FIG. 6A illustrates a beam pattern having a steering angle of −22.5° with respect to Brazil D channel.
Figure 6B:
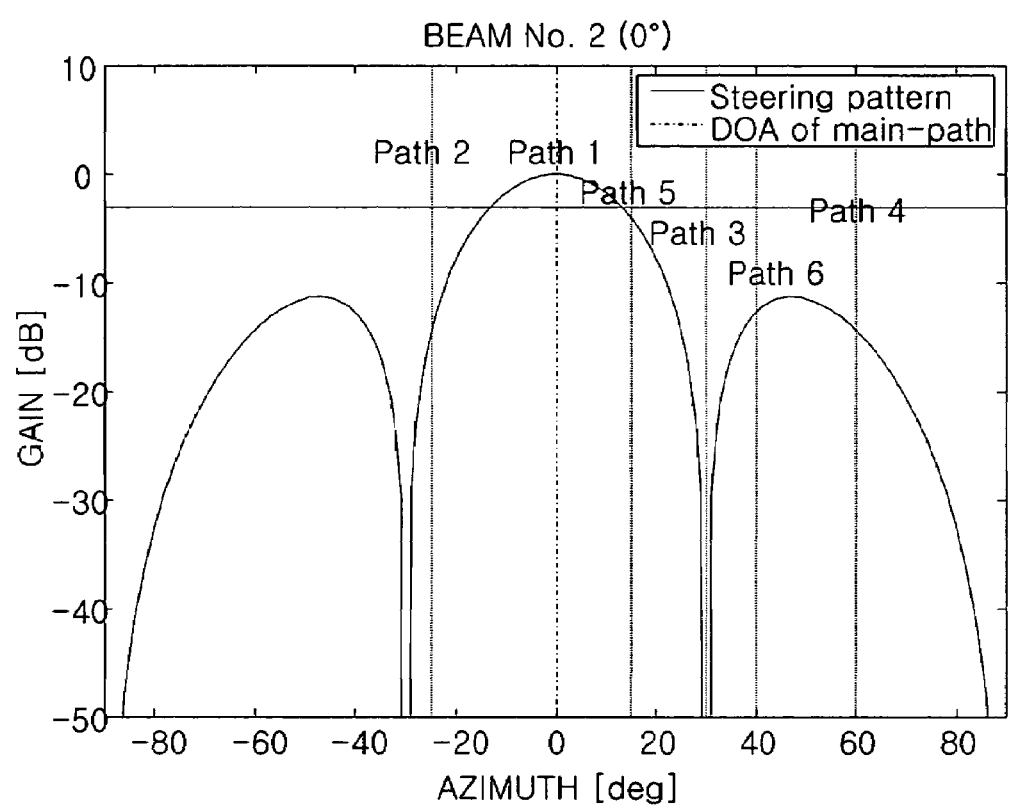
FIG. 6B illustrates a beam pattern having a steering angle of 0° with respect to Brazil D channel.
Figure 6C:
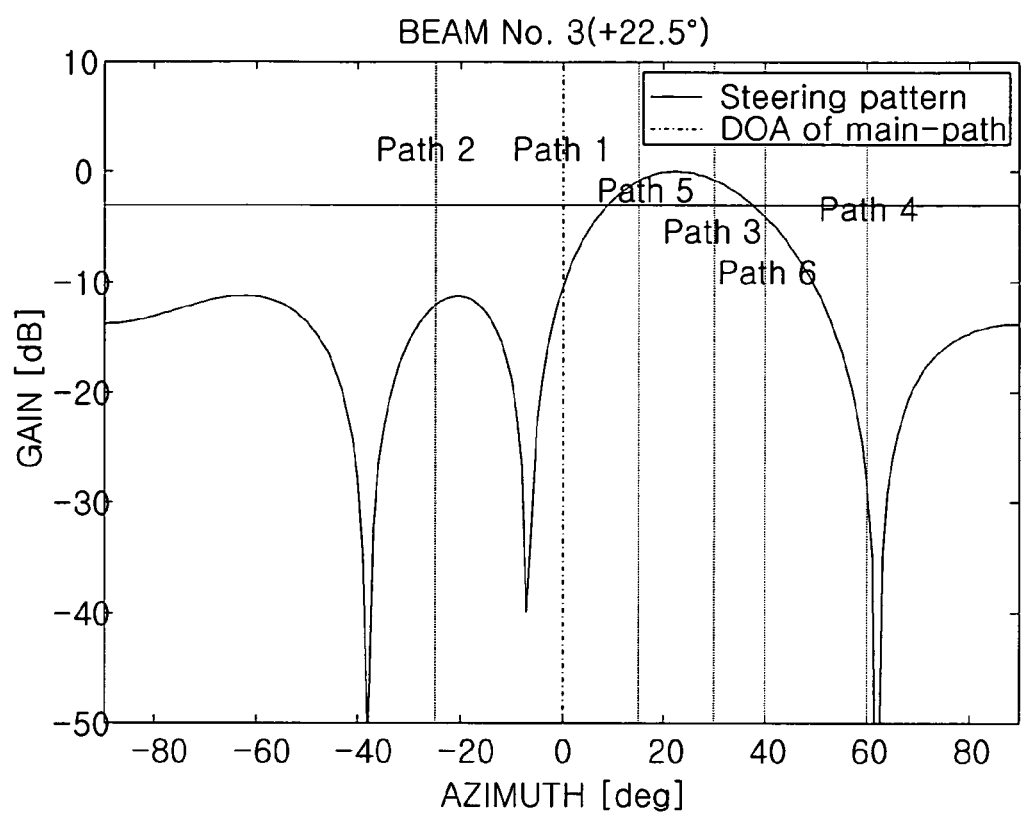
FIG. 6C illustrates a beam pattern having a steering angle of +22.5° with respect to Brazil D channel.

FIG. 6C illustrates a beam pattern having the steering angle of +22.5 with respect to the Brazil D channel. At this time, a signal incident in a range of −3 dB of a main lobe has only path 5 (a relative amplitude: 1.02, a delay time: 63.1 samples) and path 3 (a relative amplitude: 0.76, a delay time: 23.9 samples). And path 6 (a relative amplitude: 0.47, a delay time: 63.8 samples) is incident at an azimuth of 40° with the attenuation about −4 dB. An energy of the beam output signal having the steering angle of +22.5° is about 33.6, which is the largest output energy among the three beams. The channel characteristic of the received signal has Raleigh fading channel which has two paths with relatively large amplitude whose difference is about 2.4 dB by path 3 and 5, and a relatively small amplitude path due to path 6.

Here, if we compare the energy of the beam of the steering angle +22.5° and the beam of the steering angle 0°, the

TABLE 1

APPLIED BRAZIL D CHANNEL MODEL AND INCIDENT ANGLE OF EACH PATH

| PATH | ABSOLUTE AMPLITUDE | RELATIVE AMPLITUDE | AMPLITUDE [dB] | DELAY TIME [μs] | DELAY TIME [SAMPLE] | INCIDENT ANGLE [°] | NOTE |
|---|---|---|---|---|---|---|---|
| 1 | 0.2045 | 1 | 0 | 0.15 | 1.6140 | 0° | REFERENCE PATH |
| 2 | 0.1341 | 0.6557 | −3.7 | 0.63 | 6.7788 | −25° | |
| 3 | 0.1548 | 0.7570 | −2.4 | 2.22 | 23.8871 | 30° | |
| 4 | 0.1789 | 0.8748 | −1.2 | 3.05 | 32.8179 | 60° | |
| 5 | 0.2077 | 1.0156 | 0.1 | 5.86 | 63.0535 | 15° | |
| 6 | 0.1509 | 0.7379 | −2.6 | 5.93 | 63.8087 | 40° | |

The beam output signals of the beamforming part 130 obtained when the channel conditions are applied like Table 1 will be sequentially analyzed with respect to the beams having the steering angles of −22.5°, 0° and +22.5°.

FIG. 6A illustrates a beam pattern that has the steering angle of −22.5° with respect to the Brazil D channel. At this time, a signal incident in a range of −3 dB of a main lobe has only a path 2 (a relative amplitude: 0.66, a delay time: 6.8 samples). Since a signal incident at 0° is attenuated as much as about 10 dB, it does not affect the output signal. An energy of the beam output signal having the steering angle of −22.5° is about 11.1, which is a small value relatively. While a channel characteristic of the reception signal entirely has a Ricean channel characteristic that only the main path exists, the amplitude of the main path signal is small that the reception field effect may be weaker than the beams whose steering angles are 0° and +22.5°.

FIG. 6B illustrates a beam pattern that has the steering angle of 0° with respect to the Brazil D channel. At this time, a signal incident in a range of −3 dB of a main lobe has only path 1 (a relative amplitude: 1, a delay time: 1.6 samples), and path 5 (a relative amplitude: 1.02, a delay time: 63.1 samples) is incident at about −4 dB and an azimuth of 15° slightly passing −3 dB.

former has bigger energy than the latter. But the channel characteristic of the former is worse than the latter. So the output constellation of the beam having the steering angle of 0° has much better than the that of latter. Therefore, it is preferable to select the beam with the steering angle of 0° as a final output signal.

Herein, a method for selecting the optimal beam in accordance to the present invention will be described below.

As described above, a simple selection of the beam having the largest output energy may not obtain the optimal output. In other words, compared with the beam having the steering angle of 0°, the beam with the steering angle of +22.5° has a larger output energy. However, since the beam with the steering angle of 0° has a better channel characteristic of the output signal in view of VSB channel equalizer, it is preferable to select the beam with the steering angle of 0°.

In order to overcome the risks, the channel profile of the received signal through the main lobe beam, as well as the output energy, is extracted and used as the information for the optimal beam selection. The channel profile information can be obtained using the Field Sync of the VSB data frame. In other words, the channel profile information is obtained by cross-correlating the PN511 signal that exists in the Field Sync of the VSB data frame, and the optimal output beam is selected in view of the reception field effect strength and Ricean channel characteristic by using the channel profile information.

In order to obtain the channel profile information by using the PN511 signal of the Field Sync, the correlating unit 220 cross-correlates the PN511 signal existing in the Field Sync of the VSB data frame and the known Field Sync PN511 signal of the VSB transmission system. Then, the channel profile extracting unit 230 extracts the time-domain channel profile of the multiple reception paths by using the cross-correlation values.

At this time, the channel profile extracting unit 230 extracts the channel profile, and the effective signal path searching unit 240 calculates the number of effective signal paths having a value larger than a predefined threshold. At the optimal beam selecting unit 250, the beam of the channel profile having the largest amplitude of the effective signal path is selected as an output beam among the beams of the channel profiles having the smallest number of the effective signal paths.

Figure 7:
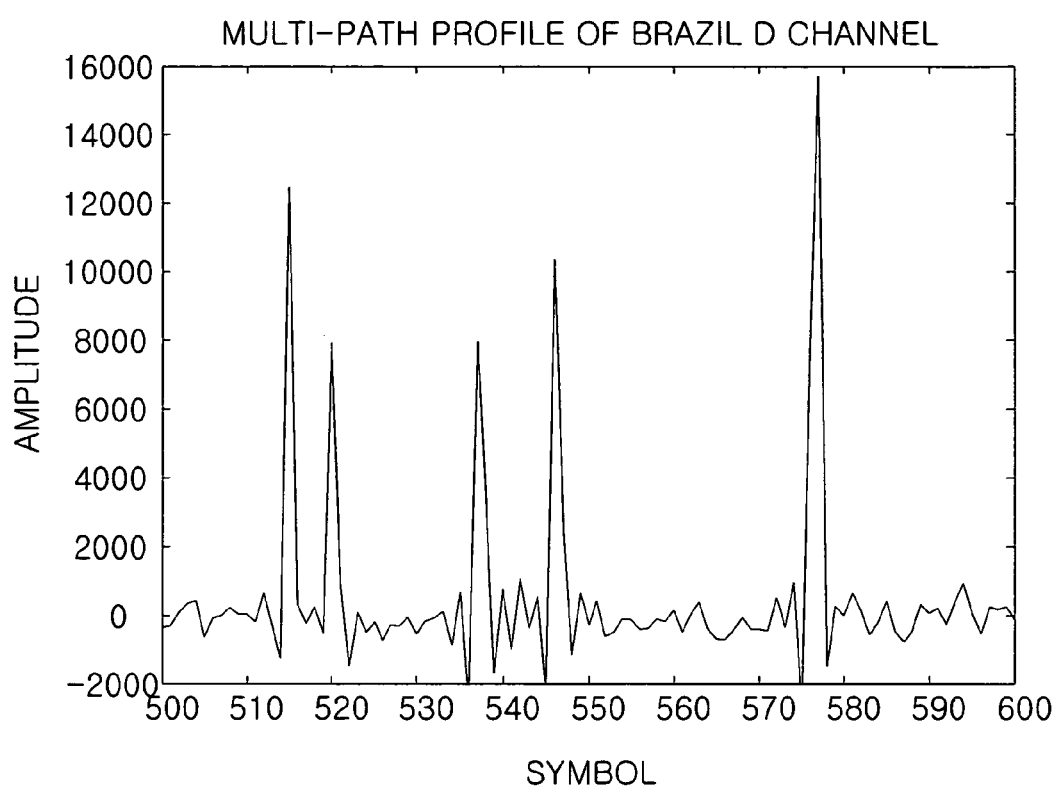
FIG. 7 illustrates an entire multi-path profile of Brazil D channel.
Figure 8A:
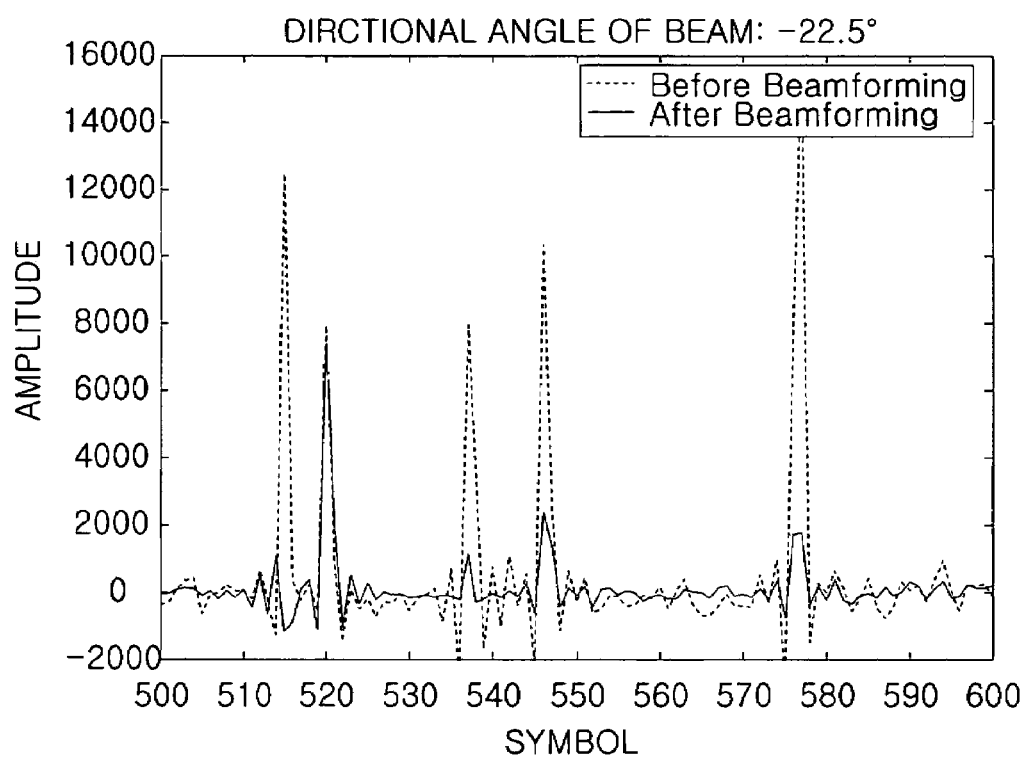
FIG. 8A illustrates the difference between the original channel profile and the improved channel profile after beamforming through the cross-correlation between the PN511 sequence and the Field Sync of received signal from the beam output whose steering angle is −22.5°.
Figure 8B:
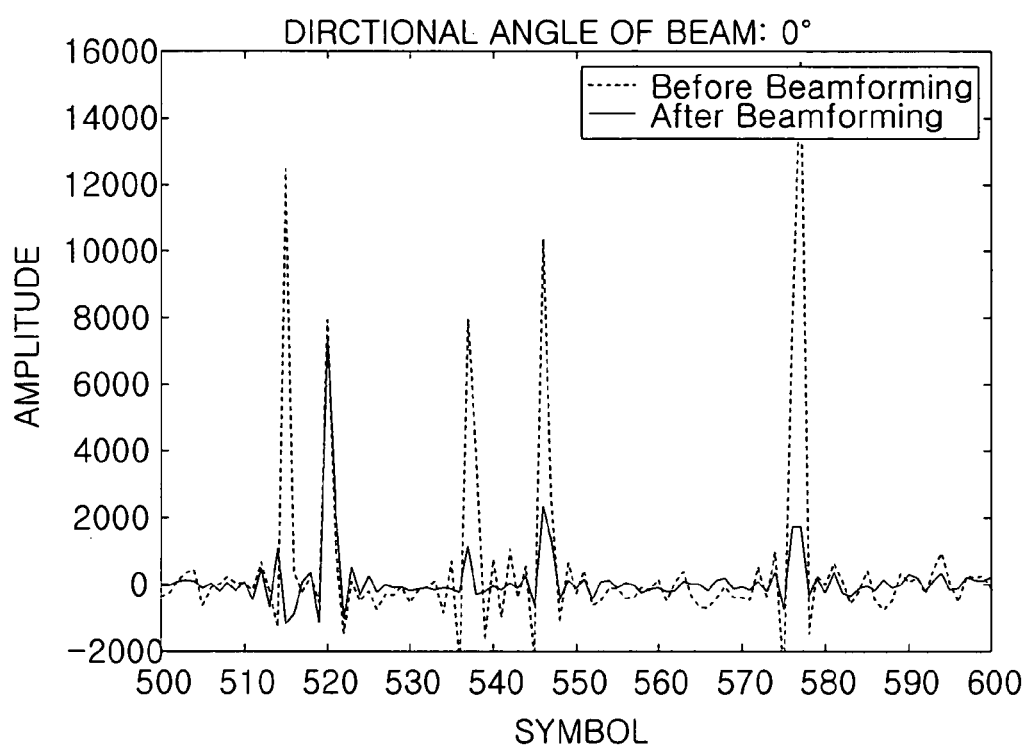
FIG. 8B illustrates the difference between the original channel profile and the improved channel profile after beamforming through the cross-correlation between the PN511 sequence and the Field Sync of received signal from the beam output whose steering angle is 0°.
Figure 8C:
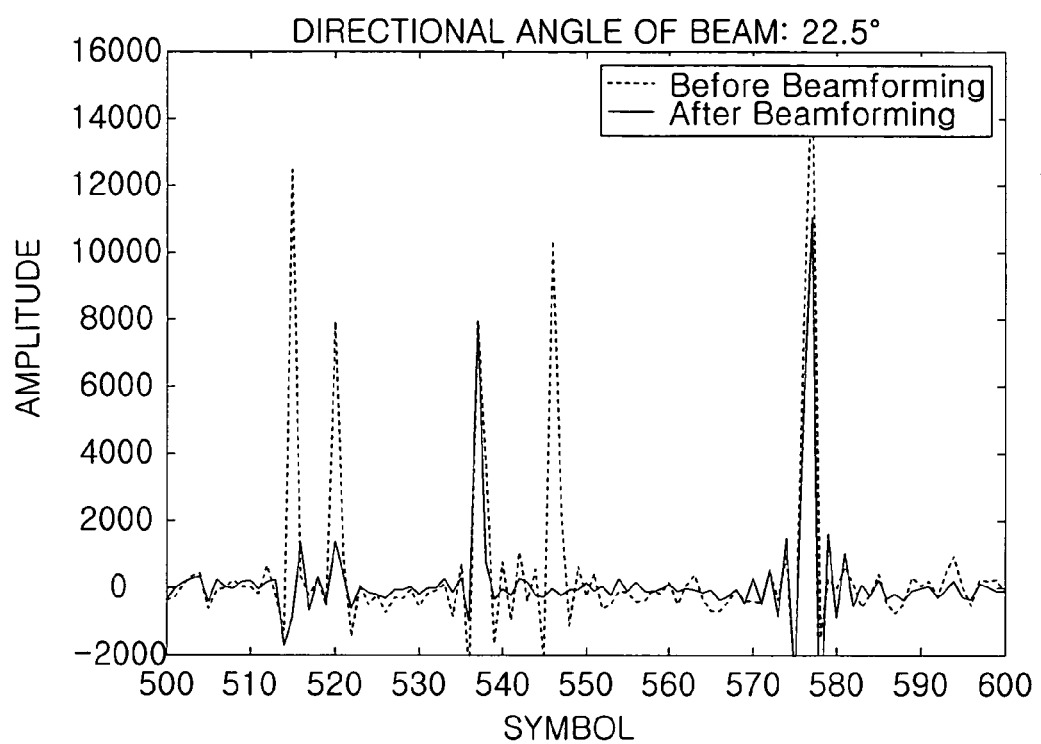
FIG. 8C illustrates the difference between the original channel profile and the improved channel profile after beamforming through the cross-correlation between the PN511 sequence and the Field Sync of received signal from the beam output whose steering angle is +22.5°.

FIG. 7 illustrates an entire multi-path profile of the Brazil D channel. FIG. 8A illustrates the difference between the original channel profile and the improved channel profile after beamforming through the cross-correlation between the PN511 sequence and the Field Sync of received signal from the beam output whose steering angle is −22.5°. FIG. 8B illustrates the difference between the original channel profile and the improved channel profile after beamforming through the cross-correlation between the PN511 sequence and the Field Sync of received signal from the beam output whose steering angle is 0° and FIG. 8C illustrates the difference between the original channel profile and the improved channel profile after beamforming through the cross-correlation between the PN511 sequence and the Field Sync of received signal from the beam output whose steering angle is +22.5°.

The analysis of the channel profiles shows that the multi-path channel profile of the beam output with the steering angle of −22.5° has the Ricean channel characteristic that the main path exists apparently, as shown in FIG. 8A. The multi-path channel profile of the beam output with the steering angle of 0° has the Ricean channel characteristic, as shown in FIG. 8B. The beam with the steering angle of 0° has two times larger main path amplitude than the beam with the steering angle of −22.5°, so that it is more advantageous in view of signal-to-noise ratio. On the other hand, the multi-path channel profile of the beam output with the steering angle +22.5° has the Rayleigh channel characteristic since there exists a very large multi-path having an amplitude difference of about 0.2 dB compared with the main path signal. So it is difficult for the channel equalizer to equalize the multipath channel interferences. Therefore, it is most preferable to select the beam with the steering angle of 0° as an output beam in view of the channel characteristic and the signal-to-noise ratio.

According to the present invention, the beam having a good channel characteristic can be selected since the beam is selected considering both the electric field strength and the optimal channel characteristic.

If the output beam is selected by the method described above, the optimal beam having the most excellent channel characteristic can be selected among multiple beams, which are considered in the switched beamforming method. At this time, in case the delay time of the multi-path is longer than the PN511 signal, it is difficult to obtain the information. However, the amplitude of the multi-path having the long delay time is small compared with the main path so that its influence is not great.

As described above, the channel characteristic of the signal inputted to the channel equalizing unit is improved by selecting the beam having the Ricean channel characteristic among multiple beams formed by the switched beamforming, thereby improving the reception performance of the digital broadcasting receiver.

While the present invention has been described with respect to the particular embodiments, it will be apparent to those skilled in the art that various changes and modifications may be made without departing from the scope of the invention as defined in the following claims.

What is claimed is:

1. A beam selecting apparatus of a digital TV receiver, the digital TV receiver having a switched beamforming means and a channel equalizing means, the beam selecting apparatus comprising:
   a correlating means for calculating cross-correlation values with respect to previous known Field Sync signals and Field Sync signals of beams, the beams having energy larger than a predefined value among beams outputted from the switched beamforming means;
   a channel profile extracting means for extracting multi-path channel profiles of the beams by using the cross-correlation values;
   an effective signal path searching means for obtaining the number of effective signal paths having values larger than a predefined threshold based on the channel profiles; and
   a beam selecting means for selecting beams of a channel profile having the smallest number of the effective signal paths among the beams outputted from the switched beamforming means as an input beam of the channel equalizing means.

2. The beam selecting apparatus as recited in claim 1, wherein the beam selecting means selects a beam of a channel profile having the largest signal amplitude of the effective signal paths among the beams of the channel profiles having the smallest number of the effective signal paths.

3. The beam selecting apparatus as recited in claim 1, wherein the predefined threshold is determined depending on a capability of the channel equalizing means capable of compensating channel distortions of the multi-path signals.

4. A beam selecting method of a digital TV receiver, the digital TV receiver having a switched beamforming means and a channel equalizing means, the beam selecting method comprising the steps of:
   a) calculating cross-correlation values with respect to previously known Field Sync signals and Field Sync signals of beams, the beams having energy larger than a predefined value among beams outputted from the switched beamforming means;
   b) extracting multi-path channel profiles of the beams by using the cross-correlation values;
   c) obtaining the number of effective signal paths having values larger than a predefined threshold based on the channel profiles; and
   d) selecting beams of a channel profile having the smallest number of the effective signal paths among the beams outputted from the switched beamforming means as an input beam of the channel equalizing means.

5. The beam selecting method as recited in claim 4, wherein the step d) selects a beam of a channel profile having the largest signal amplitude of the effective signal paths among the beams of the channel profiles having the smallest number of the effective signal paths.

6. The beam selecting method as recited in claim 4, wherein the predefined threshold is determined depending on a capability of the channel equalizing means capable of compensating channel distortions of the multi-path signals.

* * * * *